United States Patent [19]

Huggins

[11] Patent Number: 4,467,682
[45] Date of Patent: Aug. 28, 1984

[54] ROTARY TUBING CUTTER

[75] Inventor: Ronald D. Huggins, Bullard, Tex.

[73] Assignee: Anvil Corporation, Jacksonville, Tex.

[21] Appl. No.: 431,711

[22] Filed: Sep. 30, 1982

[51] Int. Cl.³ .............................................. B23B 5/14
[52] U.S. Cl. ........................................ 82/73; 82/62
[58] Field of Search ................ 82/73, 74, 71, 62, 100, 82/2 E, 1.2; 30/97

[56] References Cited

U.S. PATENT DOCUMENTS

| | | |
|---|---|---|
| 532,845 | 1/1895 | Tucker . |
| 1,085,967 | 2/1914 | Brown . |
| 1,172,781 | 2/1916 | Forsyth et al. ..................... 408/170 |
| 1,715,872 | 6/1929 | Stevens . |
| 2,516,817 | 7/1950 | Wernli . |
| 3,165,768 | 1/1965 | Herbkersman .......................... 82/20 |
| 3,641,851 | 2/1972 | Gibbs et al. . |
| 3,739,666 | 6/1973 | Wright et al. .......................... 82/71 |
| 3,772,945 | 11/1973 | Varga . |
| 4,235,137 | 11/1980 | Harman . |

Primary Examiner—Leonidas Vlachos

Attorney, Agent, or Firm—Richards, Harris & Medlock

[57] ABSTRACT

A tubing cutter (20) includes a rotary shaft member (22) having three hubs (28, 30, 32) extending therefrom to define three angularly spaced radial guideways (34, 36, 38) between the hubs. A radially slidable cutting wheel carrier (80) and two contact wheel carriers (110, 112) are slidable within the radial guideways. A cutter actuator (200) cooperates with the rotary shaft member to control the radial movement of the wheel carriers. The actuator includes a sleeve portion with three actuating arms (208, 210, 212) for registering in the outer portion of the guideways for engaging the wheel carriers. The surfaces of the actuating arms cooperating with the wheel carriers are designed to force the wheel carriers radially inwardly when the actuator arm is moved relative to the shaft member. A cutting wheel is mounted on the cutting wheel carrier for cutting a pipe positioned in the cutoff device as it is moved inwardly. Contact wheels (124) are mounted on the contact wheel carriers (104) and engage and support the tubing during the cutting operation.

4 Claims, 5 Drawing Figures

ROTARY TUBING CUTTER

TECHNICAL FIELD

The present invention relates to a rotary tubing cutter and more specifically to a tubing cutter having a cam actuator which provides for positive advancement and retraction of the cutter.

BACKGROUND ART

Numerous apparatus have been used in the past to sever pipe or tubing to desired lengths. An early cutter design is shown in U.S. Pat. No. 532,845 to W. W. Tucker which incorporates a rotatable head with angularly spaced support rollers and a radially translatable cutter wheel which may be adjusted inwardly against tubing positioned between the rollers and the cutter wheel. This design does not permit the radial movement of the cutter during operation of the device and thus does not lend itself to ease and speed of operation.

A later design is shown in U.S. Pat. No. 3,772,945 to John F. Varga. This device also discloses a tube cutoff device having a rotatable cutter head with a central opening therethrough for feeding a tube into the cutoff device. The head is rotatable around the tube and the cutter is cammed radially inwardly by a sleeve to engage and sever the tube. The cutter is biased outwardly by a spring as are two angularly spaced tube support rollers. The camming sleeve is apparently not fixed relative to the head and thus may not only slide axially, but may have a tendency to move angularly relative to the head. The cam sleeve is controlled by a single cam roller which engages a follower groove in the cutter of the sleeve. This structure is subject to binding and excessive wear between the cam roller and the follower groove, as well as between the camming sleeve and the slide members on which the cutting disk and support rollers are mounted. While the patent to Varga is an improvement over the patent to Tucker, it does not provide an optimum design for a rotary cutter head of the type disclosed.

DISCLOSURE OF THE INVENTION

The present invention relates to an improved rotary tubing cutter which overcomes many of the disadvantages of the prior devices and it is believed provides a more optimum and compact structure for use in cutting stationary tubing into selected lengths. The tubing cutter includes a rotary shaft member having three hubs extending therefrom to define three angularly spaced radial guideways between the hubs at the mouth of the shaft member. A radially slidable cutting wheel carrier and two contact wheel carriers are slidable within the radial guideways. An actuator cooperates with the rotary shaft member to control the radial movement of the wheel carriers. The actuator includes a sleeve portion and three actuating arms for registering in the outer portion of the guideways for engaging the wheel carrier. The surfaces of the actuating arms cooperating with the wheel carriers are designed to force the wheel carrier radially inwardly when the actuator is moved relative to the shaft member. A cutting wheel is mounted on the cutting wheel carrier for cutting a pipe positioned in the cutoff device. Contact wheels are mounted on the contact wheel carrier and engage and support the tube during the cutting operation.

In accordance with one embodiment of the invention, the outer end of the cutting wheel carrier includes a ramp with a T-section extending therefrom. The actuating arm engaging the wheel carrier includes a corresponding ramp and structure for interlocking with the T-section of the contact means. The cutting wheel carrier is forced radially inwardly upon movement of the actuating arm in a first direction and is drawn outwardly upon movement of the actuating arm in a direction opposite the first direction.

In accordance with another embodiment of the invention, the actuating arms engaging the contact wheel carriers have an inwardly facing pair of steps. The carriers normally rest on the outer step and are moved inwardly as the actuating arms move relative to the wheel carriers such that the wheel carriers rest on the inner step.

In accordance with still a further embodiment of the invention, the cutting wheel and the contact wheels are mounted on shafts extending from the wheel carriers. The cutoff device further includes a shield attached to the hubs of the rotatable shaft. The shield has a plurality of radial slots for cooperating with the extension of the shafts of the contact wheels to control the radial movement of the wheels.

BRIEF DESCRIPTION OF THE DRAWINGS

For a more complete understanding of the present invention, and for further details and advantages thereof, reference is now made to the following Detailed Description taken in conjunction with the accompanying Drawings, in which:

FIG. 2 is a perspective exploded view thereof;

DETAILED DESCRIPTION

Figure 1:
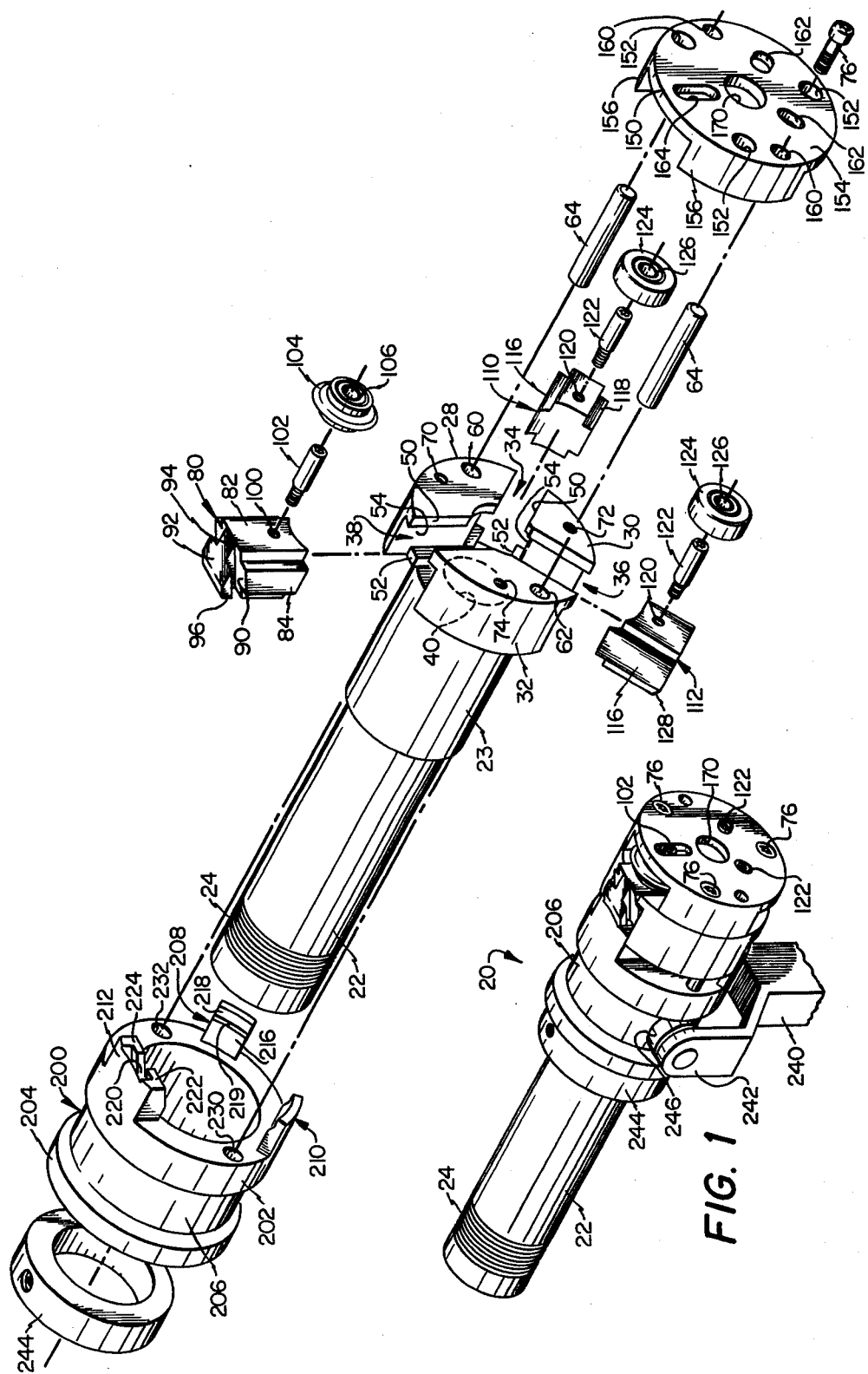
FIG. 1 is a perspective view of the rotary tubing cutter of the present invention.
Figure 3:
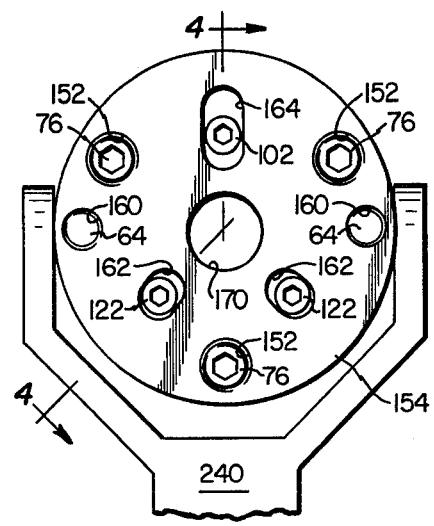
FIG. 3 is an end view thereof.

Referring to FIG. 1, rotary tubing cutter 20 includes a drive shaft 22 with an enlarged section 23 and threads 24 on the end thereof for engagement into an appropriate rotary drive unit. Referring to FIGS. 1 and 2, drive shaft 22 has three angularly spaced hubs 28, 30 and 32 attached from the end thereof and defining three angularly spaced guideways 34, 36 and 38 between the hubs at the mouth 40 of the drive shaft. As will be noted hereinafter in greater detail, drive shaft 22 has an aperture therethrough along the longitudinal axis for receiving tubing through the shaft.

Referring specifically to FIG. 2, each face of hubs 28, 30 and 32 defining one of the walls of guideways 34, 36 and 38 includes an upstanding forward and rearward rail, 50 and 52, respectively, defining a recessed channel 54 therebetween. As is shown in FIG. 2, rails 50 extend to the outer radius of hubs 28, 30 and 32 while rails 52 terminate at some point radially inwardly from the outer radius of hubs 28, 30 and 32.

Hubs 28 and 32 have guide pin receiving apertures 60 and 62 therein for receiving guide pins 64. Hubs 28, 30 and 32 also have tapped apertures 70, 72 and 74, respectively, for receiving shield attachment bolts 76.

Guideway 38 receives cutting wheel carrier 80 which slides radially within the guideway. Cutting wheel carrier 80 includes a body portion 82 having a protrusion 84 extending from each side thereof for engaging channel 54 in guideway 38. The radially outwardly facing end of cutting wheel carrier 80 includes an inclined ramp 90 having a T-section 92 extending therefrom. T-section 92 includes a base portion 94 and a cap 96 having an inwardly facing surface which is parallel to and spaced from inclined ramp 90. The forward face of cutting wheel carrier 80 has a tapped aperture 100 for receiving cutting wheel shaft 102 therein. A cutting wheel 104 is mounted on shaft 102 with an appropriate bearing 106 positioned between the wheel and the shaft.

Contact wheel carriers 110 and 112 are designed for radial engagement in guideways 34 and 36, respectively. Wheel carriers 110 and 112 consist of a body portion 114 having side extensions 116 and 118 extending therefrom for engagement between side rails 50 and 52 of passageways 34 and 36. The outer end of contact wheel carriers 110 and 112 is planar with a chamfered edge 128. Each contact wheel carrier has a tapped aperture 120 in the face thereof for receiving a shaft 122 therein. A contact wheel 124 is mounted on each shaft 122 with an appropriate bearing 126 mounted between the wheel and shaft.

A shield 150 is mounted to hubs 28, 30 and 32 by bolts 76 which are engaged through apertures 152. Shield 150 includes a face plate 154 and legs 156 which position the face plate 154 a prescribed distance from the hubs 28, 30 and 32. Face plate 154, in addition to apertures 152, has apertures 160 for receiving the ends of guide pins 64 therein and two angularly spaced slots 162 and a third slot 164 angularly spaced between slots 162. Slots 162 are positioned such that they receive the ends of contact wheel shafts 122 therein upon assembly. Slot 164 is positioned such that it receives the end of cutting wheel shaft 102 therein. As will be described hereinafter in greater detail, slots 162 limit the radial movement of contact wheels 124. Face plate 154 also has an aperture 170 aligned with the center thereof.

A cutter actuator 200 is slidably engaged over drive shaft 22. The actuator includes a main body 202, a collar 204 and a follower groove 206 between the collar and main body. Contact wheel actuator arms 208 and 210 extend outwardly from main body 202 as does a cutter wheel actuator arm 212. Contact wheel actuator arms 208 and 210 have an inner and outer step 216 and 218, respectively, with a chamfered surface 219 therebetween. Cutter wheel actuator arm 212 has an inclined aperture 220 for receiving cap 96 of T-section 92 of cutting wheel carrier 80. Aperture 220 is partially defined by arms 222 and 224 which engage cap 96 on the underside thereof. Arms 222 and 224 are spaced one from the other to permit the movement of the base 94 of T-section 92 of carrier 80 to pass therebetween.

A pair of apertures 230 and 232 is formed in main body 202 and slidably receives the ends of guide pins 64 therein.

As can be seen in the assembly drawing of FIG. 1, actuator arms 208 and 210 register in the outer portion of guideways 34 and 36 with contact wheel carriers 110 and 112 positioned radially inwardly of the actuator arms. Similarly, cutter wheel actuator arm 212 registers in the outer portion of guideway 38 and receives cap 96 of T-section 92 within inclined aperture 220. As is also shown in FIG. 1, a cutter actuator arm 240 includes a forked end 242 for engagement within follower groove 206. A stop ring 244 may be attached to drive shaft 22 to limit the movement of cutter actuator 200 in the direction of the stop ring. Rollers 246 are mounted from the arms of forked end 242 and provide a rotative surface for engagement against collar 204 and main body 202 of cutter actuator 200.

Figure 4A:
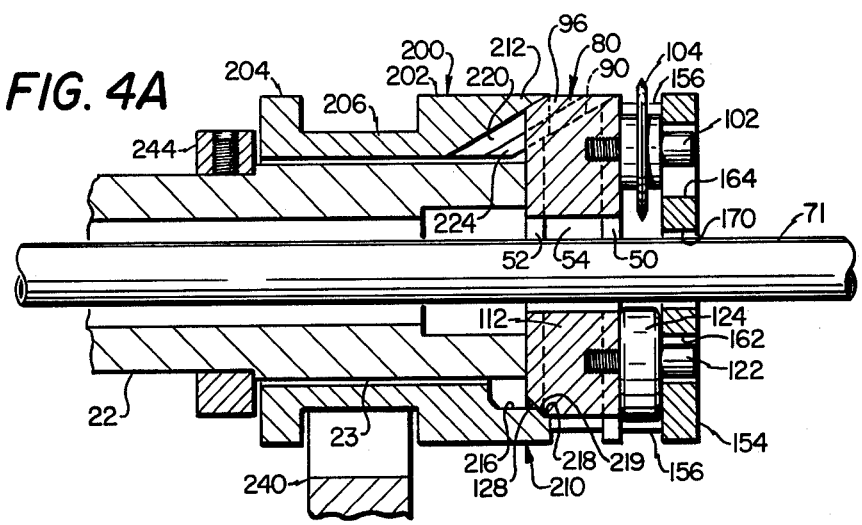
FIGS. 4a and 4b are section views taken along line 4—4 of FIG. 3 showing the tubing cutter in the retracted and cutting positions, respectively.
Figure 4B:
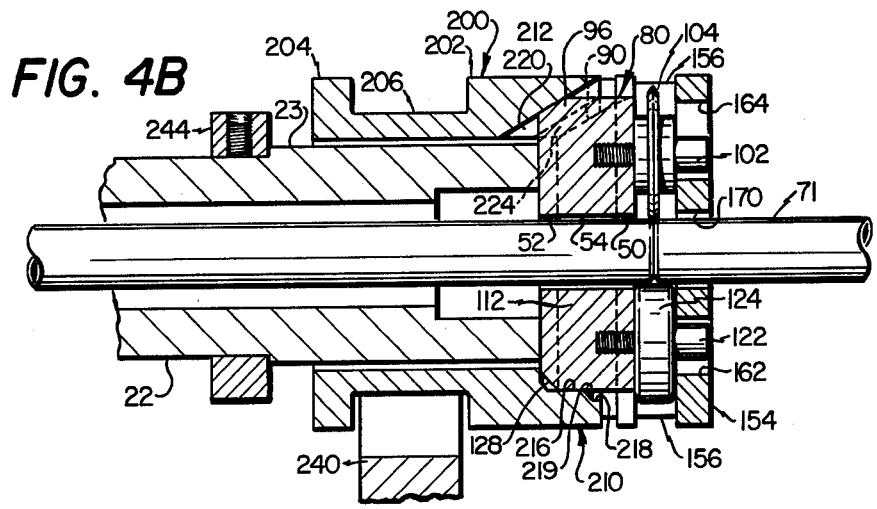

Referring to FIGS. 4a and 4b, in operation, cutter actuator 200 is withdrawn on drive shaft 22 to engagement with stop ring 244. The withdrawal of cutter actuator 200 causes cutting wheel carrier 80 and cutting wheel 104 attached thereto to be drawn radially outwardly as a result of the movement of T-section 92 upwardly in inclined aperture 220 of cutter wheel actuator arm 212. Drive shaft 22, mounted in an appropriate rotative chuck using threads 24, is rotated causing contact wheel carriers 110 and 112 to be moved radially outwardly in guideways 34 and 36 under the action of centrifugal force. The outer movement of contact wheel carriers 110 and 112 is arrested by the engagement of these carriers on steps 218 of actuator arms 208 and 210. Tubing is inserted through drive shaft 22 and through aperture 170 of shield 150. Cutting is achieved by moving cutter actuator 200 axially along drive shaft 22. The movement of cutter actuator 200 toward cutting wheel carrier 80 forces the carrier radially inwardly as T-section 92 moves downwardly along inclined aperture 220 of the cutter wheel actuator arm 212. Simultaneously, contact wheel carriers 110 and 112 are moved radially inwardly by movement from outer step 218 to inner step 216 on actuator arms 208 and 210. With this motion, contact wheels 124 engage tubing T and cutting wheel 104 is progressively moved inwardly to contact and sever tubing T as cutter actuator 200 is moved axially in response to the movement of cutter actuator arm 240. Subsequent to cutting the tubing, cutter actuator 200 is moved in the opposite direction on drive shaft 22, positively drawing cutting wheel carrier 80 radially outwardly away from tubing T and permitting the movement of contact wheels 124 and their respective contact wheel carriers away from the tubing as the carriers move from step 216 to step 218 on actuator arms 208 and 210. Tubing is then advanced through the rotary cutting device and the cutting procedure is repeated.

As will be noticed in FIG. 4a, the elongated apertures 160 in shield 150 limit the radial outward movement of contact wheels 124 by the engagement of contact wheel shafts 122 with the outermost portion of the elongated apertures.

As can now be appreciated, the present invention provides positive and precise control over both the movement of the cutting wheel inwardly against the tubing and the retraction of the cutting wheel subsequent to cutting. This eliminates any possibility of interference between the cutting wheel and the tubing upon advancement of the tubing. Thus, the operation of the device is efficient and eliminates the risk of damage which might be caused to the tubing during movement of the tubing through the device by the failure of the cutting wheel to properly withdraw from its cutting position. As can be noted in FIG. 4a, the aperture 170 in shield 150 virtually eliminates any possibility of inadvertent engagement of the cutting wheel 104 with the tubing when the cutting wheel is in the retracted position and the tubing is being moved through the cutoff device.

Further, the present invention provides for the registering of cutter wheel actuator arm 212 and contact wheel actuator arms 208 and 210 with the outer portion of the guideways defined between hubs 28, 30 and 32. Thus, rotation between the cutter actuator and drive shaft 22 is eliminated while providing a very compact and sturdy tool.

Although preferred embodiments of the invention have been described in the foregoing Detailed Description and illustrated in the accompanying Drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modifications and substitutions of parts and elements as fall within the spirit and scope of the invention.

I claim:

1. A tube cutoff device comprising:
   a rotatable shaft member having three hubs extending therefrom to define three angularly spaced radial guideways between said hubs at the mouth of said shaft member;
   three radially slidable tube contact means slidable within said radial guideways;
   actuator means having a sleeve portion and three actuating arms for registering in the outer portion of said guideways for engaging said tube contact means, the surfaces on said actuating arms cooperating with said tube contact means to force said contact means radially inwardly when said actuator means is moved relative to said shaft member;
   a cutter means on one of said tube contact means for cutting a pipe positioned within said device; and
   roller means on the other two tube contact means for engaging said tube during the cutting operation;
   the outer end of the tube contact means having the cutter means thereon comprising a ramp having a T-section extending therefrom and said actuating arm engaging said cutter tube contact means comprising a corresponding ramp and structure for slidably interlocking with the T-section of said cutter tube contact means such that said cutter tube contact means is forced radially inwardly upon movement of said actuating arm in a first direction and is drawn outwardly upon movement of said actuating arm in a second direction opposite the first direction, said actuating arms engaging said roller tube contact means comprising an inwardly facing pair of nonrotating steps with said tube contact means normally resting on said outer step and movable inwardly as said actuating arms are moved relative to said roller tube contact means such that said roller tube contact means rests on said inner step thereby moving said roller tube contact means radially inwardly in step fashion and into engagement with said tube prior to engagement of said tube by said cutter means.

2. The cutoff device according to claim 1 wherein said cutter means and roller means are mounted on shafts extending from said slidable tube contact means and further comprising a shield attached to the hubs of said rotatable shaft, said shield having a plurality of radial slots for cooperating with the extension of the shafts of the roller means to control the radial movement of said roller means.

3. A tube cutoff device comprising:
   a rotatable shaft member having three hubs extending therefrom to define three angularly spaced radial guideways between said hubs at the mouth of said shaft member, said guideways being opened to the side opposite said shaft member;
   three radially slidable tube contact means slidable within said radial guideways, said tube contact means slidably interconnecting with said guideways and being restricted thereby from longitudinal movement relative to said shaft member;
   actuator means having a sleeve portion and three actuating arms for engaging said tube contact means, the surfaces on said actuating arms cooperating with said tube contact means to force said contact means radially inwardly when said actuator means is moved longitudinally relative to said shaft member, one tube contact means having a ramp with a T-section extending therefrom and cooperating with one actuating arm including a corresponding ramp and structure for interlocking with the T-section of said one contact means such that said one contact means is forced radially inwardly upon movement of said actuating arm in a first direction and is drawn outwardly upon movement of said actuating arm in a second direction opposite the first direction;
   a cutter means mounted on said one tube contact means on the face thereof exposed to said guideway opening to the side opposite said shaft member for cutting a pipe positioned within the device; and
   roller means mounted on the tube contact means other than said one tube contact means on the faces thereof exposed to said guideway opening, said roller means for engaging said tube during the cutting operation; said actuating arms engaging the tube contact means other than said one tube contact means having an inwardly facing pair of steps with said tube contact means normally resting on said outer steps and movable inwardly as said actuating arms are moved relative to said tube contact means as said tube contact means moves onto said inner step.

4. The cutoff device according to claim 3 wherein said cutter means and roller means are mounted on shafts extending from said slidable tube contact means and further comprising a shield attached to the hubs of said rotatable shaft, said shield having a plurality of radial slots for cooperating with the extension of the shafts of the roller means to control the radial movement of said roller means.

* * * * *